July 16, 1963 J. E. RAISTAKKA 3,097,819
SAFETY PARACHUTE FOR DISABLED AIRPLANES
Filed May 14, 1962

*INVENTOR.*
JOHN E. RAISTAKKA

BY *Kimmel & Crowell*

ATTORNEYS

United States Patent Office 3,097,819
Patented July 16, 1963

3,097,819
SAFETY PARACHUTE FOR DISABLED AIRPLANES
John E. Raistakka, 1414 SW. 12th Ave.,
Portland, Oreg.
Filed May 14, 1962, Ser. No. 194,228
3 Claims. (Cl. 244—139)

This invention relates to a safety parachute for disabled airplanes insuring an upright, gentle landing in emergencies.

A primary object of this invention is the provision of a parachute within a container, located in the upper surface of the fuselage of an airplane.

Another object of this device resides in a pilot parachute, to extract the main parachute, having a conical shape container on its top, said container being filled with helium to insure that the pilot parachute assumes an upward vertical position, thus pulling the main parachute straight up avoiding any fouling with the airplane's wing or tail assemblies.

A further object is the provision of a suitable means of ejecting the pilot parachute from the parachute container.

Another object resides in the provision of a safety device to prevent the main parachute from being hauled out of the storage container, in the event that the pilot parachute is accidentally triggered.

An additional object of this device is the provision of an automatic hatch-door opener for the hatch doors of the parachute container.

Still other objects will in part be obvious and in part be pointed out hereinafter and shown in the accompanying drawing wherein.

Similar reference characters refer to similar parts throughout the several views of the drawing.

Figure 1:
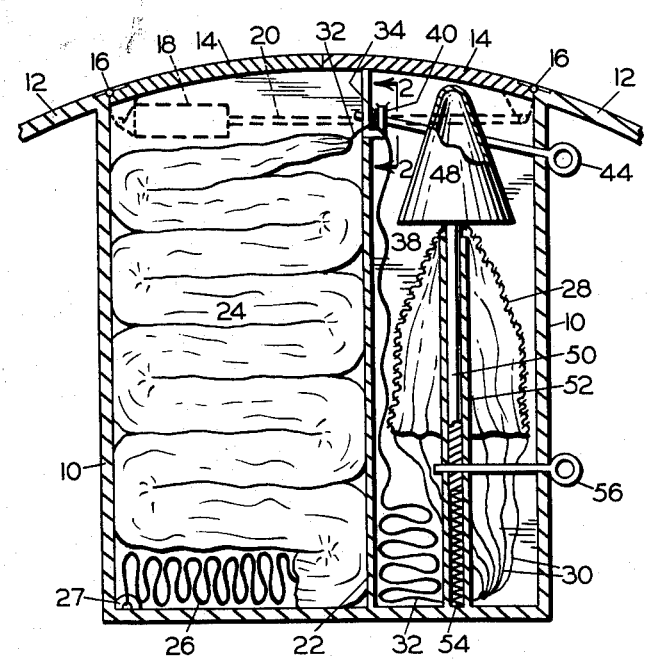
FIGURE 1 is a cross-sectional view of the parachute container with the main parachute illustrated stowed and, also, the pilot parachute positioned in relation thereto, as taken along line 1—1 of FIGURE 3 and viewed in the direction of the arrows.

This invention consists of a storage container 10 integral with the airplane's fuselage 12 and suitably reinforced to withstand the normal shock of the opening of a parachute and suspension therefrom. Container 10 has incorporated therewith closure hatches 14, hingedly mounted to the airplane's fuselage 12 by hinges 16. Hatches 14 are hydraulically controlled by a hydraulic cylinder 18 and piston arm 20, shown in broken line, or other suitable control system strong enough to overcome the outside air resistance, the hydraulic system, or assembly, being located on the outside and to the rear of container 10. Container 10 has a partition wall 22 dividing said container into two chambers, vertically, as seen in FIGURE 1. On one side of partition wall 22 is stowed a main parachute 24 with its associated shroud lines 26, secured to the container 10 by a securing anchor, or ring, 27. On the opposite side of partition wall 22 is stowed a pilot parachute 28 together with its shroud lines 30. Pilot parachute shroud lines 30 are attached to main parachute 24 by a tow line 32.

Figure 2:
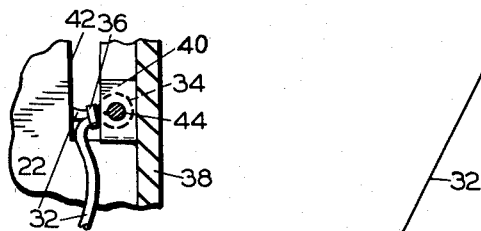
FIGURE 2 is an enlarged sectional view of the main parachute safety device, taken along line 2—2 of FIGURE 1, as viewed in the direction of the arrows.
Figure 3:
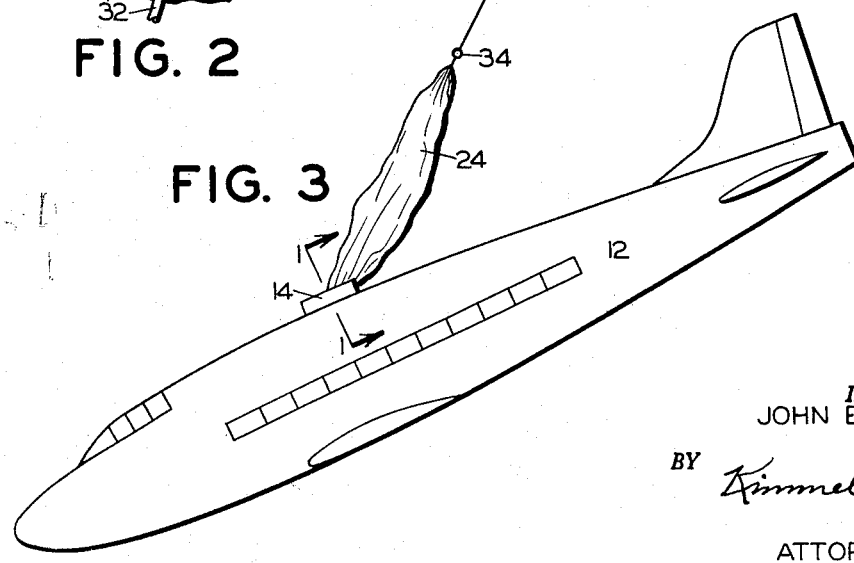
FIGURE 3 is a diagrammatic view of the pilot parachute pulling the main parachute from its container located in the airplane's fuselage.

The tow line 32 has a loop 34 formed therein, by use of the crimping member 36, in advance of the attachment of tow line 32 to main parachute 24. Integral with partition wall 22 and adjacent a rear bulkhead 38 of the storage container 10 is an L bracket 40. At the upper edge of partition wall 22, in close proximity to the L bracket 40, is a slot 42 to allow tow line 32 freely to be inserted and withdrawn from within the storage container 10, as best viewed in FIGURE 2. When main parachute 24 and parachute 28 are stowed, tow line 32 is inserted into the slot 42 in such a manner that the loop 34 is positioned within the L bracket 40, as illustrated in FIGURE 2, and the safety pin, or shaft, 44 inserted through a suitable port 46 in the L bracket 40, through loop 34 and hence through a companion port (not shown) through partition wall 22.

The pilot parachute assembly consists of the pilot parachute 28, a hollow helium filled cone 48, and an integral ejection shaft 50.

To eject the pilot parachute assembly, an ejection tube 52, an ejection spring 54 and a suitable releasing device 56 are employed. The releasing device 56 may be controlled in any suitable manner and from any suitable location within the airplane.

In the operation and use of this device, when an airborne aircraft is disabled, the container closure hatches 14 are opened by the hydraulic cylinder 18 and the piston arm 20, activated by suitable controls (not shown). When the hatches 14 are fully opened, safety pin, or shaft, 44 is pulled free of loop 34 in the tow line 32, releasing device 56 is triggered by suitable controls (not shown), and the pilot parachute assembly (pilot parachute 28, helium filled cone 48 and ejection shaft 50) is propelled away from the airplane fuselage 12 through the action of ejection spring 54. Safety shaft 44 and releasing device 56 may be so arranged that they will be activated simultaneously by a single control (not shown).

Once away from the airplane, the pilot parachute assembly assumes an upward vertical position because of the action asserted by the lighter-than-air helium filled member 48. This insures that the main parachute 24 will be pulled straight upward, thereby eliminating the possibility of fouling main parachute 24 with the airplane in any way regardless of the position of the airplane at this point.

Ejection tube 52 may be pivotally mounted by means of a ball socket, or the like, (not shown) and controlled from outside the container 10, at its bottom, if desired, to better give direction to the ejection of the pilot parachute assembly in the event that the aircraft is banking at the time.

When the main parachute 24 is fully opened, the aircraft may fall gently to the ground, thus greatly increasing the chances of saving the lives of the crew members and passengers, as well as the aircraft itself in many instances.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. A parachute assembly for aircraft comprising a receptacle secured within the fuselage of the aircraft and open exteriorly thereof, remotely actuated hatch covers for said receptacle, a main parachute in said receptacle, an auxiliary parachute secured to said main parachute in said receptacle, a hollow lighter than air body secured to said auxiliary parachute, means for releasing said body and said auxiliary parachute prior to release of said main parachute, said lighter than air body comprising a helium filled cone,
   a stem on said cone, and spring ejecting means for said stem.
2. A parachute assembly for aircraft comprising a receptacle secured within the fuselage of the aircraft and open exteriorly thereof, remotely actuated hatch covers for said receptacle, a main parachute in said receptacle, an auxiliary parachute secured to said main parachute in said receptacle, a hollow lighter than air body secured to said auxiliary parachute, means for releasing said body and said auxiliary parachute prior to release of said main parachute, said lighter than air body comprising a helium filled cone, a stem on said cone, spring ejecting means for said stem, and a safety release pin normally extended through said stem.

3. A parachute assembly for aircraft comprising a receptacle secured within the fuselage of the aircraft and open exteriorly thereof, remotely actuated hatch covers for said receptacle, a main parachute in said receptacle, an auxiliary parachute secured to said main parachute in said receptacle, a hollow lighter than air body secured to said auxiliary parachute, means for releasing said body and said auxiliary parachute prior to release of said main parachute, said lighter than air body comprising a helium filled cone, a stem on said cone, spring ejecting means for said stem, a safety release pin normally extended through said stem, and a second safety release pin for normally holding said main parachute within said receptacle in the event said auxiliary parachute is accidentally released.

References Cited in the file of this patent

UNITED STATES PATENTS

| | | |
|---|---|---|
| 987,819 | Ostand | Mar. 28, 1911 |
| 1,443,745 | Holt | Jan. 30, 1923 |
| 1,702,422 | Stevens | Feb. 19, 1929 |
| 2,352,721 | Krahel | July 4, 1944 |
| 2,513,867 | Hefferman | July 4, 1950 |
| 2,628,307 | Lloyd et al. | Feb. 10, 1954 |
| 2,879,017 | Smith | Mar. 24, 1959 |
| 2,967,677 | Winzen et al. | Jan. 10, 1961 |
| 2,967,685 | Magnuson | Jan. 10, 1961 |
| 2,973,171 | Ward et al. | Feb. 28, 1961 |
| 3,072,372 | Lorory | Jan. 8, 1963 |

FOREIGN PATENTS

| | | |
|---|---|---|
| 302,671 | Great Britain | Dec. 18, 1928 |
| 528,597 | Italy | June 14, 1955 |